(12) United States Patent
Ström et al.

(10) Patent No.: US 7,940,283 B2
(45) Date of Patent: May 10, 2011

(54) METHOD AND APPARATUS FOR PIXEL SAMPLING

(75) Inventors: Jacob Ström, Stockholm (SE); Tomas Akenine-Möller, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 323 days.

(21) Appl. No.: 11/719,742

(22) PCT Filed: Nov. 18, 2005

(86) PCT No.: PCT/EP2005/012371
§ 371 (c)(1),
(2), (4) Date: Mar. 11, 2009

(87) PCT Pub. No.: WO2006/053762
PCT Pub. Date: May 26, 2006

(65) Prior Publication Data
US 2009/0213137 A1    Aug. 27, 2009

Related U.S. Application Data

(60) Provisional application No. 60/630,628, filed on Nov. 24, 2004.

(30) Foreign Application Priority Data

Nov. 19, 2004    (EP) .................................. 04027570

(51) Int. Cl.
*G09G 5/00*    (2006.01)
(52) U.S. Cl. ........ 345/613; 345/582; 345/589; 345/611; 382/260; 382/269

(58) Field of Classification Search .................. None
See application file for complete search history.

(56) References Cited

U.S. PATENT DOCUMENTS

| | | | | |
|---|---|---|---|---|
| 5,684,939 | A * | 11/1997 | Foran et al. .................. | 345/612 |
| 6,501,483 | B1 * | 12/2002 | Wong et al. | |
| 6,636,218 | B1 * | 10/2003 | Nelson .......................... | 345/441 |
| 6,720,975 | B1 * | 4/2004 | Dietrich, Jr. ................. | 345/611 |
| 2002/0140706 | A1 * | 10/2002 | Peterson et al. | |
| 2003/0122815 | A1 * | 7/2003 | Deering | |

FOREIGN PATENT DOCUMENTS

EP    1 431 920 A    6/2004
(Continued)

OTHER PUBLICATIONS

NVIDIA: "hrra: High-resolution antialiasing through multisampling" Technical Brief, 2002, XP002246880.

(Continued)

*Primary Examiner* — Antonio A Caschera
(74) *Attorney, Agent, or Firm* — Potomac Patent Group PLLC

(57) ABSTRACT

A method and a device for generating a pixel value from a plurality of sample values being generated from a plurality of sample points. The method comprises generating a plurality of sample values; and weighting said plurality of sample values for determining said pixel value. Each sample value is generated from one of a plurality of candidate sample points within a sample region. The sample region is positioned at a corner of two intersecting borders of the pixel. The size of the sample region is smaller than the size of the pixel. The device is arranged to carry out the method according to the invention.

22 Claims, 6 Drawing Sheets

FOREIGN PATENT DOCUMENTS

| WO | 00/33256 A | * | 6/2002 |
| WO | 2004/057538 A | * | 7/2004 |

OTHER PUBLICATIONS

PCT International Search Report, mailed Mar. 2, 2006, in connection with International Publication No. PCT/EP2005/012371.

PCT International Preliminary Report on Patentability, mailed Mar. 8, 2007, in connection with International Publication No. PCT/EP2005/012371.

Chinese Second Office Action, dated Mar. 27, 2009, in connection with corresponding Chinese Patent Application 200580046917.4.

* cited by examiner

METHOD AND APPARATUS FOR PIXEL SAMPLING

CROSS-REFERENCE TO RELATED APPLICATIONS

This application claims the benefit of U.S. Provisional Application No. 60/630,628, filed Nov. 24, 2004, which is hereby incorporated herein by reference in its entirety. This application also claims priority under 35 U.S.C. §119 to European Patent Application No. 04027570.3, filed Nov. 19, 2004, which is hereby incorporated herein by reference in its entirety.

TECHNICAL FIELD OF THE INVENTION

Generally, the present invention relates to graphic processing and more specifically to a method and apparatus for producing anti-aliased graphic pictures at high frame rates with low computational cost.

DESCRIPTION OF RELATED ART

Since the early days of computer graphics, aliasing has been a problem when presenting still or moving pictures on a display. This problem occurs e.g. when one sample generated from the centre of a pixel is utilized for determining the color to be rendered.

One approach to combat the low visual quality of aliased pictures is to use anti-aliasing techniques. One such technique is supersampling, which provides a good picture quality but has the drawback of a low frame rate due to a heavy computational burden. More specifically, supersampling generates a picture at a higher resolution than the final resolution that is displayed on the screen. This is done by generating multiple sample values for each pixel to be displayed, i.e. the value of each pixel will be a weighted sum of the sample values. For example, each displayed pixel may comprise the filtered or weighted sum of a group of four samples values taken from subpixels within the borders of a pixel. This implies that the graphics hardware has to process four times as many samples for each displayed pixel compared to a single sample per pixel.

The patent document WO-00/33256 discloses a system that utilizes a supersampling scheme. Each pixel is divided into a more or less fine-meshed grid, which defines a subpixel grid, where sample points may be located. The sample points may be arranged in many different configurations inside the pixel boundaries. The configuration of the sample point pattern is then repeated for every pixel to be displayed. The final value for each pixel comprises the weighted sum of three or more samples values taken within subpixels according to the discussion above. A drawback with this approach is that it requires substantive computational and memory capabilities, as three or more sample values have to be calculated and retrieved from the memory for the processing of each pixel.

In order to lower the computational burden for producing anti-aliased pixels, a modified supersampling scheme, which is referred to as a multisampling scheme, may be used. The key idea of a multisampling scheme is to share computations between samples. Furthermore, a multisampling scheme can also share sample values between neighboring pixels (note that this is not the same as sharing computations). The latter multisampling scheme is referred to as a sample-sharing scheme.

The GeForce3 graphics processing unit from NVIDIA Corporation, Santa Clara, USA provides hardware that supports multisampling and sharing of subsamples between pixels. The multisampling scheme is referred to as "Quincunx" and presents a sample pattern in form of a "5" on a die, i.e. five sample values are used for calculating the value of the final pixel. However, due to the locations of the sample points, only two sample values per pixel need to be calculated; the rest of the sample values are based on sample values generated for neighboring pixels. The centre sample value is given the weight 0.5 while the peripheral sample values are given the weight 0.125 each. In a subsequent step, the generated pixel values are filtered in the same way as with an ordinary supersampling scheme.

Detailed information regarding the Quincunx scheme may be found in "Technical Brief, HRAA: High-Resolution Anti-aliasing through Multisampling" from NVIDIA Corporation.

A portable electronic equipment, such as a mobile radio terminal, a mobile telephone, an electronic organizer, a smartphone, etc. has limited battery capacity. Memory access is relatively power consuming compared to the available battery capacity in portable electronic equipment. Also, the memory capacity of such equipment is often limited. Thus, it is often preferred that a graphics process is as efficient as possible, wherein the memory accesses for providing an anti-aliased picture are kept at a minimum. Although the Quincunx scheme is more efficient than other super- or multi-sampling schemes known in the art, it still requires substantive computational capabilities.

Accordingly, the computational burden for producing anti-aliased pictures is a problem in modern electronic graphics systems. The problem is even more severe when an anti-aliasing scheme is to be used for producing images in a device with reduced computational capability and limited memory capacity.

EP-A-1,431,920 discloses a method for determining a sample point pattern. Each sample point pattern is a mirror image of and different from the sample point pattern of a neighboring pixel. The sample point pattern has one sample point per pixel edge. Samples are shared between neighboring pixels.

SUMMARY OF THE INVENTION

It is therefore an object of the invention to provide a method and a device for generating pixel values for an anti-aliased picture, which method and device require a low computational power, wherein at least the memory requirements are reduced compared to the known related art for producing anti-aliased pictures.

The object is achieved according to a first aspect of the invention by a method for generating a pixel value from a plurality of sample values being generated from a plurality of sample points. The sample values are weighted for determining the pixel value. Each sample value is generated from a sample point within a sample region. The position of the sample point is taken from a plurality of candidate position, all of which are within the sample region. The sample region is positioned at a corner of two intersecting borders of the pixel and the size of the sample region is smaller than the size of the pixel. In one embodiment, the sample region is centered around a corner of two intersecting borders of the pixel.

The sample region may be centered around a corner of two intersecting borders of said pixel. The sample point may be positioned at any location within the sample region.

Each sample value for determining the pixel value of one pixel may be generated from a sample point which is positioned at a different distance from the center of the pixel in the x-direction and also at a different distance from the center of the pixel in the y-direction.

Only one of said plurality of sample points, which are generated for determining the pixel value of one pixel may be positioned on the same 45 degree imaginary line in relation to a border of the pixel.

The object is achieved according to a second aspect of the invention by an apparatus for generating a pixel value from a plurality of sample values. The device comprises a sampling device arranged to generate a plurality of sample values; and a weighting device arranged to weight said plurality of sample values for determining said pixel value. The said sampling device is arranged to generate each sample value from a sample point within a sample region. The sample point is taken from a plurality candidate sample points, all of which are positioned within the sample region. The sample region is positioned at a corner of two intersecting borders of the pixel and the size of the sample region is smaller than the size of the pixel. In one embodiment, the sample region is centered around a corner of two intersecting borders of the pixel.

The sampling device may be arranged to generate each sample value from a sample point within a sample region being centered around a corner of two intersecting borders of said pixel. Furthermore, the sampling device may be arranged to generate each sample value from a sample region comprising n times n subpixels, wherein said pixel comprises p times p subpixels, where p is larger than n.

Further embodiments of the invention are defined in the dependent claims.

It is an advantage of the invention that the generated pixel values will produce an anti-aliased image. Furthermore, it is an advantage of the invention that sample values may be shared between neighboring pixels. Also, it is an advantage that only 1 sample value has to be calculated on average for the majority of pixels of an array of pixels, wherein both the computational power and memory requirements are decreased compared to other multi-sampling schemes providing an anti-aliasing effect. Also, memory requirements for the invention are the same as for a conventional sampling scheme using a simple sample at the centre of the pixel and no sample sharing between neighboring pixels, thus not providing any anti-aliasing effect. Thus, the memory requirements are not increased compared to such a conventional sampling scheme although an anti-aliasing effect is achieved. Furthermore, as the memory requirement for the invention is the same as for said conventional sampling scheme, the hardware implementing the conventional sampling scheme may be updated to perform the method according to the invention.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features and advantages of the invention will appear from the following detailed description of the invention, reference being made to the accompanying drawings, in which.

DETAILED DESCRIPTION OF EMBODIMENTS

Figure 1:
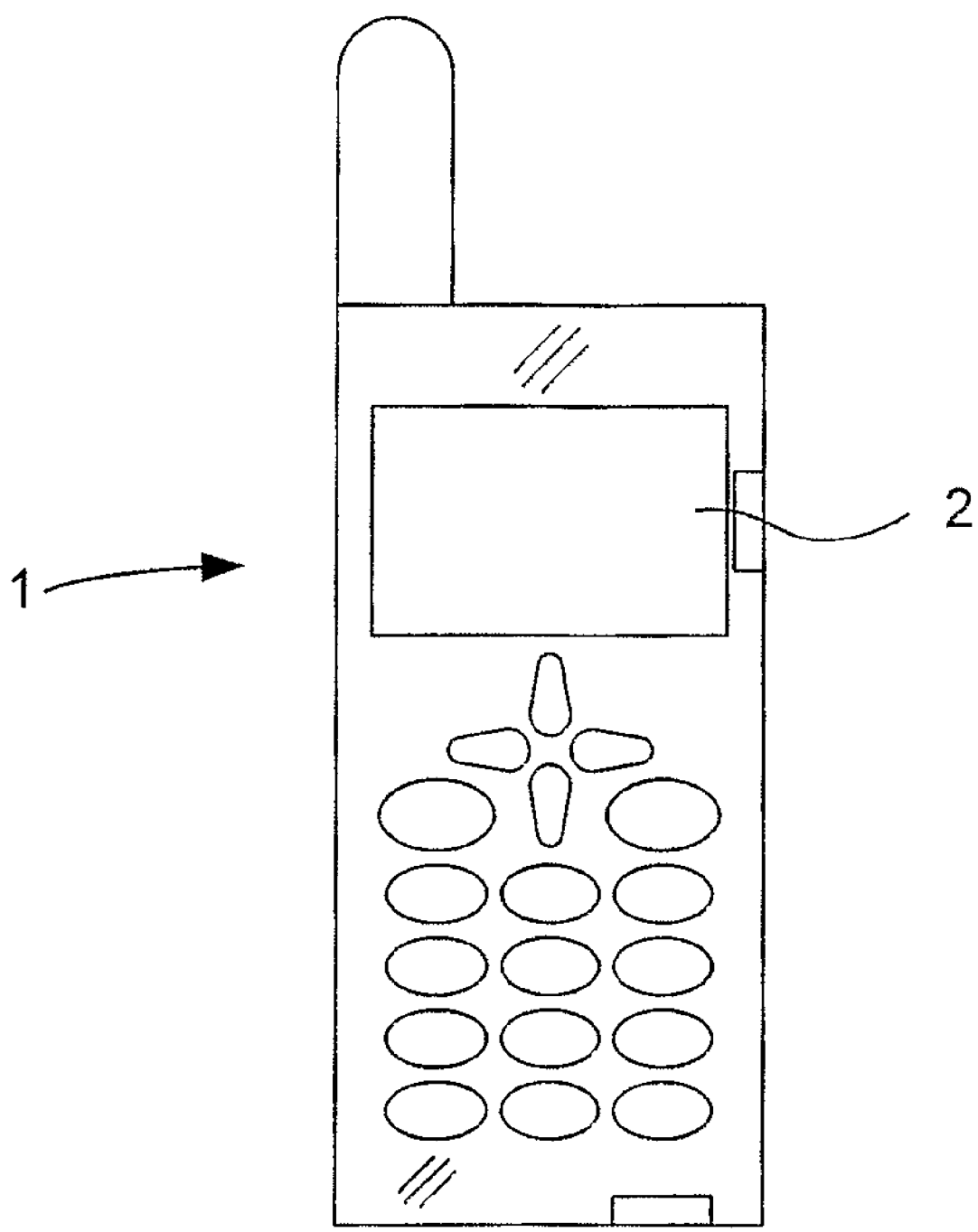
FIG. 1 is a front view of an electronic apparatus comprising a processing unit according to the invention.

FIG. 1 illustrates an electronic apparatus in which the device and method according to the invention may be implemented. The electronic apparatus is in this example embodied as, but not limited to, a mobile telephone 1. Pixel values may be determined by generating only one new sample value in average for the majority of pixels of an array of pixels. Thus, the computational and memory requirements for implementing the invention is low, wherein the present invention is useful in portable electronic devices, in which memory and battery capacity is limited, such as in a mobile radio terminal, a pager, a communicator, an electronic organizer, a smartphone, or a personal digital assistant. However, the invention may also be implemented in a stationary electronic device, such as a computer.

The mobile telephone 1 comprises a man-machine interface for interaction between a user and the mobile telephone 1. The man-machine interface comprises a display 2, e.g. an LCD display or a touch screen, on which graphics, such as 2D graphics (such as Flash or SVG (Scalable Vector Graphics) animations) and 3D graphics, may be displayed. To provide an anti-aliasing effect, objects to be shown on the display are sampled according to the method of the invention, as will be explained below.

Figure 2:
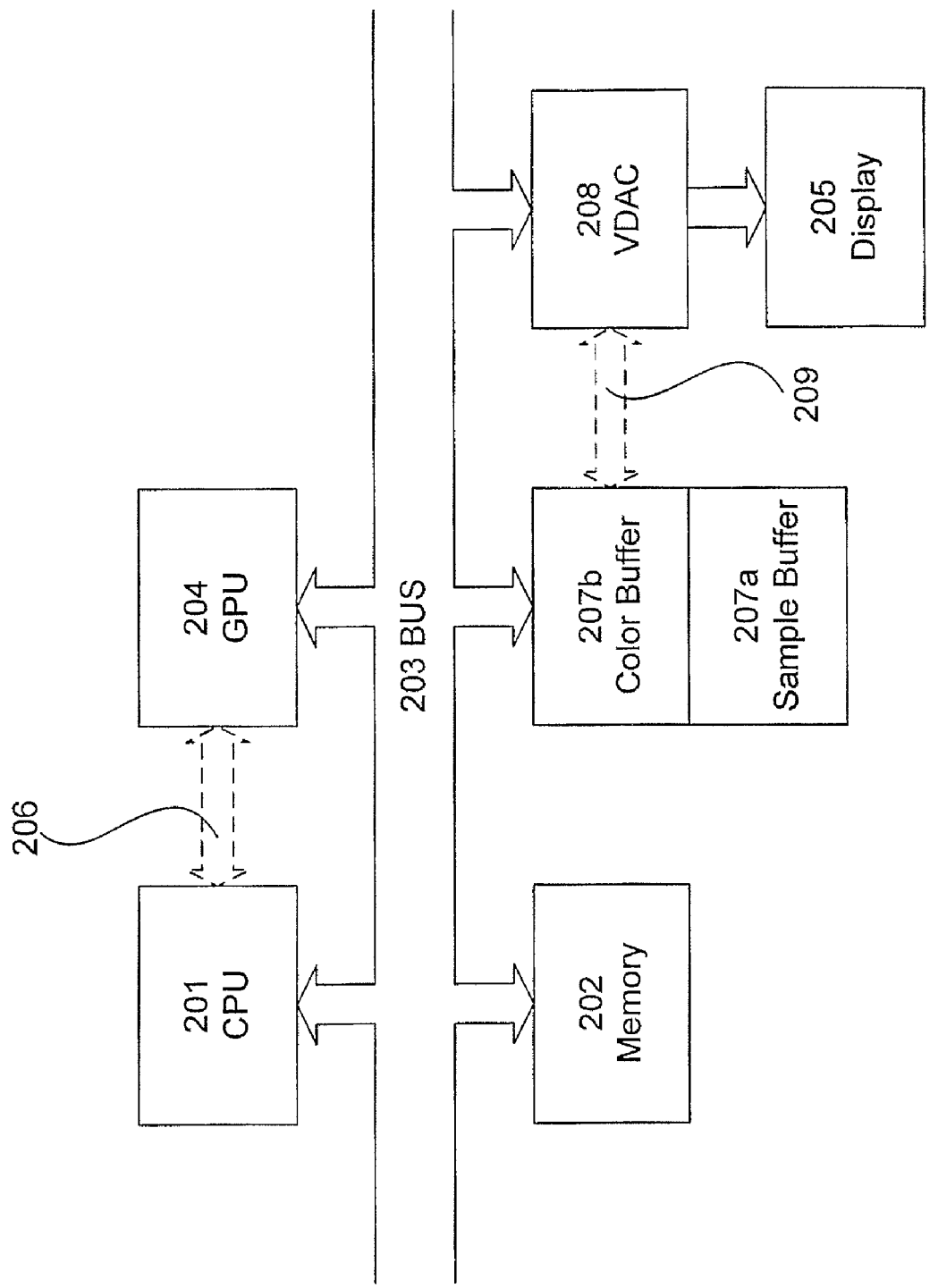
FIG. 2 is a block diagram of certain components of the electronic apparatus of FIG. 1.

FIG. 2 is a block diagram of an example of a system for drawing lines or polygons. A CPU (Central Processing Unit) 201 is connected to a memory 202 by means of a data bus 203. The memory 202 may comprise computer readable instructions or code means, such as code portions of an application program, which is run by the system. The application program may be a program for rendering a 2D graphics animation (such as an SVG animation), or a 3D graphics game. The CPU 201 retrieves instructions from the memory 202 and executes them in order to perform specific tasks. A task for the CPU 201 may be to provide a GPU 204 (Graphics Processing Unit) with information regarding the objects that shall be drawn on a display 205. The GPU 204 may be provided as a separate hardware component, such as a processor, a DSP (Digital Signal Processor), an ASIC (Application Specific Integrated Circuit), a FPGA (Field-Programmable Gate Array), hard-wired logic etc. Alternatively, the GPU 204 is implemented with a combination of software and hardware, or it may be provided in software and executed by the CPU 201. The GPU 204 is connected to the data bus 203. Alternatively, or in addition, the GPU 204 is connected to the CPU 201 by means of a separate data bus 206, which may be a high-speed data bus, in case a lot of information is to be transferred between the CPU 201 and the GPU 204. The data transfer on the separate data bus 206 will then not interfere with the data traffic on the ordinary data bus 203.

A display memory 207 is connected to the data bus 203 and stores information sent from the GPU 204 regarding the pictures (frames) that shall be drawn on the display 205. The display memory comprises a sample buffer 207a for storing information, such as sample values, of each sample and a color buffer 207*b*. The color buffer 207*b* holds the pixel values generated, such as colors of the pixels to be displayed on the display 205 after the rendering of a previous image is completed. Alternatively, the same memory is utilized for the sample buffer and the color buffer. After having rendered all triangles to a sample buffer, the sample values may be converted to pixels in place, inside the sample buffer. After that, the buffer can be used as a color buffer. Still alternatively, it is also possible to do the conversion on the fly when moving the pixels to the display.

As with the interconnection between the CPU 201 and the GPU 204, the display memory 207 may be connected directly to the GPU 204 by means of a separate, high-speed bus (not shown). The display memory 207 may also form part of the memory 202. Since the GPU 204 and the display memory 207 normally are used for producing a continuous stream of images, it is an advantage if the link between these two units is as fast as possible and does not block the normal traffic on the data bus 203.

For determining the value of a certain pixel, the CPU 201 or the GPU 204 retrieves a plurality of sample values from the sample buffer 207*a*, calculates the pixel value and stores the calculated pixel value in the color buffer 207*b*.

The display memory 207 is connected to a VDAC 208 (Video Digital to Analog Converter), either by means of the shared data bus 203 or by a separate high-speed bus 209. The VDAC 208 reads the information from the color buffer 207*b* and converts it to an analog signal, e.g. a RGB (Red, Green, Blue) composite signal that is provided to the display 205 in order to draw the individual pixels thereon.

Figure 3A:
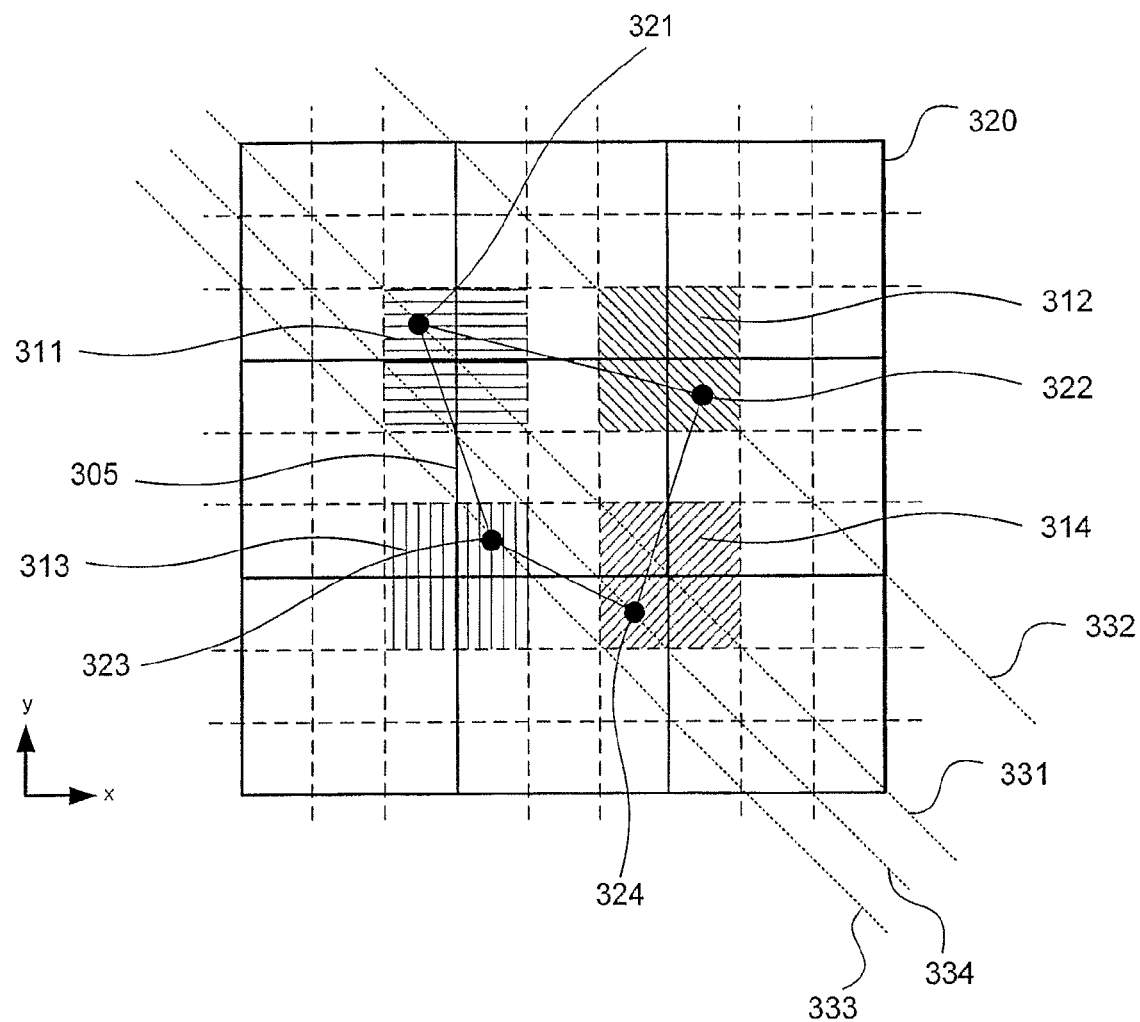
FIG. 3a is a schematic illustration of a plurality of pixels, sample regions and a first embodiment of the location of sample points for samples within said regions.

As discussed above, many different techniques have been used in order to produce anti-aliased representations of lines and polygons. FIG. 3*a* illustrates an embodiment of a multi-sampling scheme comprising a plurality of samples generated at a plurality of sample points for each pixel. According to one embodiment, each pixel is divided into p times p subpixels. Each sample value is generated from one of a plurality of sample points positioned within a sample region, which is located at a corner of two intersecting borders of the pixel for which a pixel value is to be determined. The size of the sample region is smaller than the size of the pixel. Each sample region may comprise a plurality of subpixels, such as n times n subpixels. As the size of the sample region is smaller than the size of the pixel, n is less than p.

FIG. 3*a* illustrates an array of 3 times 3 pixels, wherein each pixel is divided into 3 times 3 subpixels. However, this is only an example and each pixel can have any number of subpixels. In FIG. 3*a*, the samples for determining a sample value of a centre pixel 305 are illustrated. Sample regions 311, 312, 313, 314 are positioned at the corners of the intersecting borders of the pixel. Is this embodiment, the sample regions 311-314 comprise 2 times 2 subpixels centred around different intersectional points of two borders of the centre pixel 305. However, the sample regions 311-314 need not be centred around said intersectional point, e.g. if the number of subpixels of the sample regions 311-314 is odd.

Each sample region 311-314 comprises a plurality of candidate sample points or sample locations, such as one sample point in the centre of each subpixel of the sample region 311-314. However, the sample point may be positioned anywhere within the boundaries of a sample region, and may e.g. be chosen randomly. According to one embodiment, a sample value will be generated from one of said plurality of candidate sample points. For the generation of one pixel value, a plurality of sample values is utilized. In the embodiment of FIG. 3*a*, four sample values generated from different sample regions are utilized, as will be explained below. However, less than four sample values may be utilized depending on the needed quality of the anti-aliasing effect. Generating the sample values for determining a pixel value from four different sample regions has the advantage of providing a good anti-aliasing effect.

In FIG. 3*a*, the sample region comprises 2 times 2 subpixels, and thus 4 possible sample points. The sample points 321, 322, 323, 324 at which sample values will be generated in this embodiment are located such that only one sample point is positioned within each sample region 311-314. Furthermore, each sample point for determining the pixel value of one pixel may be positioned at a different distance from the center of the pixel in the x-direction and also at a different distance from the center of the pixel in the y-direction. This is an advantage as it provides a good anti-aliasing scheme if the upper most sample points 321 and 322 are not positioned at the same row of subpixels, and the downmost sample points 323, 324 are not positioned at the same row of subpixels. A first sample point 321 may be positioned in column 3, row 3 of the pixel array 320; a second sample point 322 may be positioned in column 7, row 4 of the pixel array 320; a third sample point may be positioned in column 4, row 6 of the pixel array 320; and a fourth sample point 324 may be positioned in column 6, row 7 of the pixel array 320. In the embodiment of FIG. 3*a* each sample point for the generation of sample values for determining the pixel value of one pixel are positioned at different distance from the center of the pixel in the x-direction and also at a different distance from the center of the pixel in the y-direction. Thus, no two sample points are positioned at the same distance from the center of the pixel both in the x-direction and the y-direction. This is an advantage, as the sampling scheme will generate good anti-aliased pictures for near-vertical and near-horizontal edges, which are the most critical ones in respect to aliasing.

Furthermore, from FIG. 3*a* it can bee seen that only one of the sample points 321, 322, 323, 324, from which sample values will be generated and utilized, may be positioned on the same 45 degree imaginary line 331, 332, 333, 334 in relation to a border of the pixel 305. However, this is not necessary as is illustrated in the embodiments below. It is an advantage if only one sample point for the sample values for determining the pixel value of one pixel is on the same 45-degree imaginary line. For example, imagine that a vertical edge is situated to the left in FIG. 3*a*, and that the object is white to the left of the edge and black to the right of the edge. When the edge is moved to the right it starts interacting with the sample points. Firstly, sample point 321 will be crossed and lit up. This means that the intensity of the pixel will go from black (0.00) to dark grey (0.25), since one of the four sample points have been lit. Secondly, the edge will pass sample point 323, lighting up the pixel to grey (0.50). Analogously, sample point 324 and 322 will be crossed, making the pixel go through light grey (0.75) to white (1.00). Consequently, if the sample points are not positioned on the same 45 degree imaginary line, any gray scale is not missed, and the edges appears less jagged than if the sample points were positioned on the same 45 degree imaginary line. This is especially important for edges that are near-vertical or near-horizontal.

The positioning of sample points 321, 322, 323, 324 within a plurality of sample regions facilitates for sample sharing between neighboring pixels. In the embodiment described above, up to four sample values may be shared without increasing the average number of sample values for determining a pixel value to more than 1. This is an advantage as the requirements on memory capacity and computational power will be relatively low.

Figure 3B:
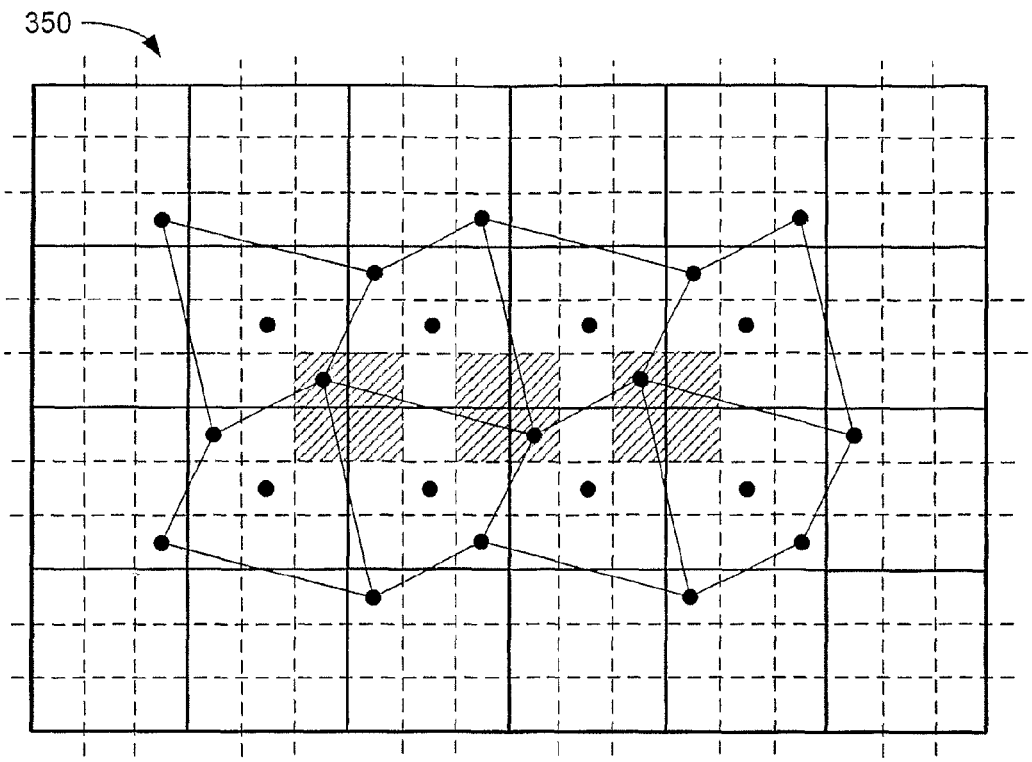
FIGS. 3b-3c are schematic illustrations of alternative positions of the samples within the sample regions.
Figure 3C:
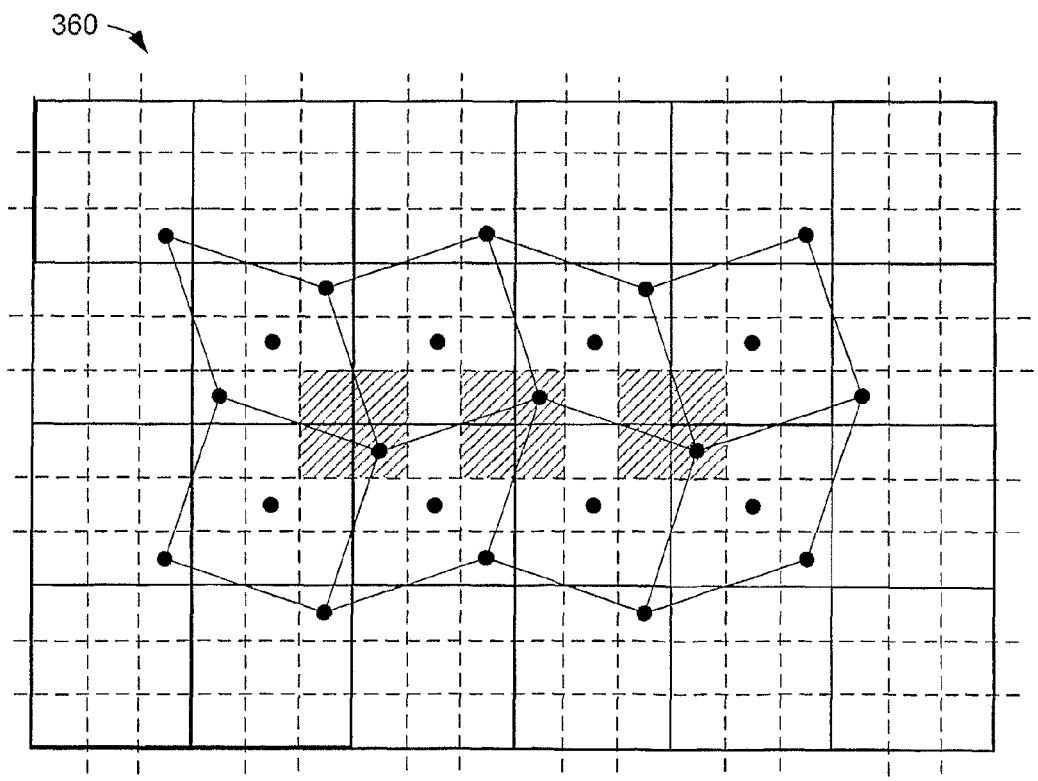

FIGS. 3b and 3c illustrate an alternative embodiment of an anti-aliasing sampling scheme in 4 times 6 pixel arrays 350, 360. Also in these embodiments, a sample value is generated from one of a plurality of sample points of a sample region positioned at a corner of two intersection borders of a pixel. The sample region is, but need not be, centred around said corner. Each sample value generated from one sample region may be used in determining the pixel value of four neighboring pixels. In these embodiments, an additional sample value is generated from the centre of each pixel. Such a sample value may also be generated in the embodiment of FIG. 3a. However, the sample value generated from the centre of each pixel is not necessary and will increase the average number of samples per pixel to two. On the other hand, quality will increase, and texture mapping will look better, since a greater weight can be given to the centre sample value.

To determine the pixel value of a certain pixel, each sample value associated with said certain pixel is given a certain weight. The sum of the weight should equal 1. Thus, if the number of sample values is four and averaging is used, each weight is given the value 0.25. However, other weights may be used, e.g. giving the sample value positioned within the borders of the pixel, for which the pixel value should be determined, the weight 0.4 and the other three sample values the weight 0.2. Other weights are possible in other embodiments and have to be tested and evaluated in each particular case.

Figure 4:
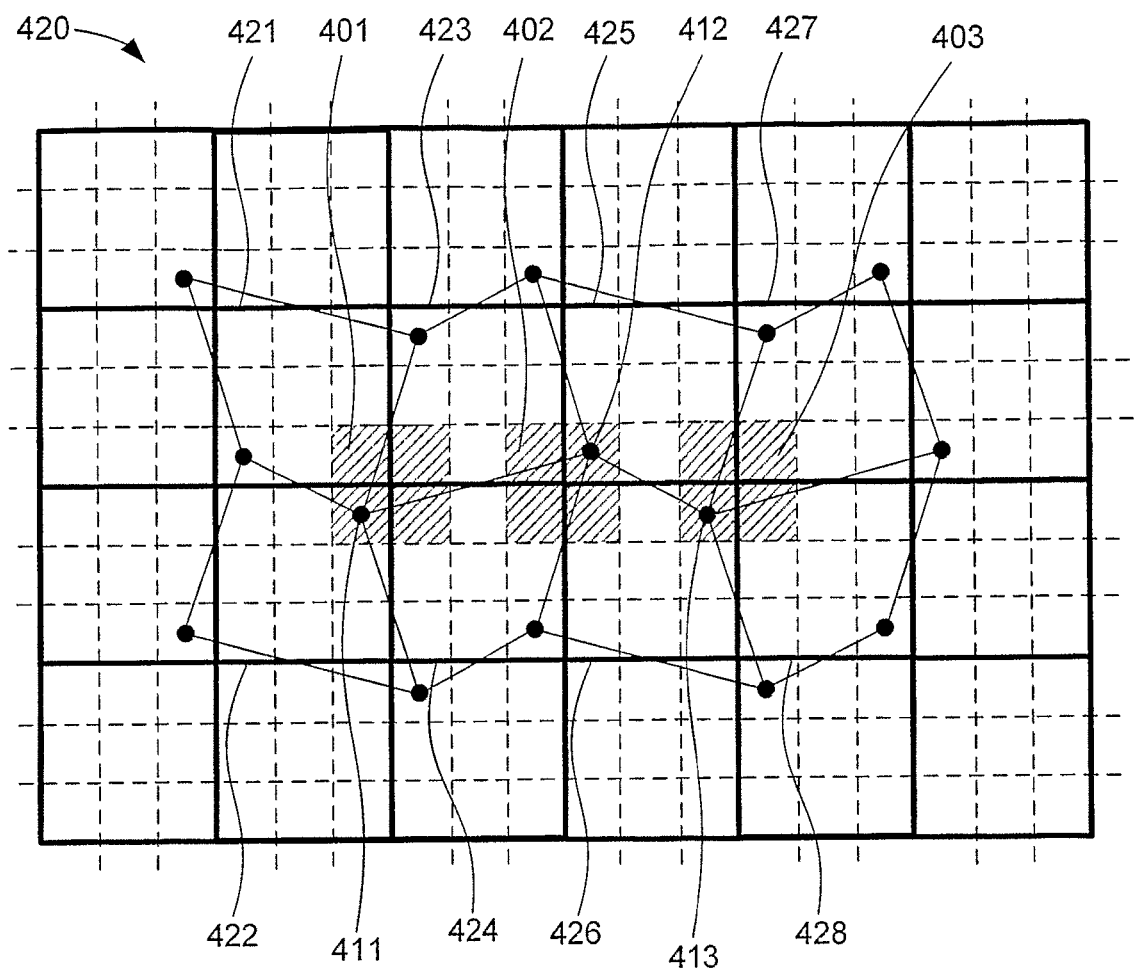
FIG. 4 is a schematic illustration of a plurality of pixels, a plurality of sample regions, and a plurality of sample points.

FIG. 4 illustrates an embodiment of the anti-aliasing scheme in a 4 times 6 pixel array 420, where the middle 2 times 4 pixels have a sufficient number of samples. As can be seen from FIG. 4, the three sample regions 401, 402, 403 in the middle of the pixel array 420 comprises sample points 411, 412, 413, at which sample values may be generated, that each are used in determining the pixel value of four pixels. The sample value generated from sample point 411 is utilized for determining the pixel value of pixels 421, 422, 423 and 424. The sample value generated from sample point 412 is utilized for determining the pixel value of pixels 423, 424, 425 and 426. The sample value generated from sample point 413 is utilized for determining the pixel value of pixels 425, 426, 427 and 428.

By examining FIG. 4, it is evident that the sample pattern illustrated in FIG. 3a is utilized, wherein sample values may be shared between up to four pixels. For this sample scheme, the sample pattern varies when traversing to a neighboring pattern, and the period is two. The pattern is varied to be able to share sample points between neighboring pixels. The majority (for a relatively large grid of pixels) of the sample values only have to be generated once for four pixels, wherein the calculation cost is 0.25 per sample value. The rectangular structure of FIGS. 4, 3b and 3c are easier to rasterize than a pattern that would not repeat.

Consequently, by using the sampling scheme according to the invention, all pixels, except for the uppermost and leftmost pixels, or bottommost and rightmost pixels, on the display 2, 205 require in average a calculation of only 1 (0.25+0.25+0.25+0.25=1) new sample value for determining the final value of each pixel. This is a significant improvement compared to known multi-sampling configurations wherein more than one sample value has to be generated in average for determining each pixel value and to produce an anti-aliased picture to be rendered.

The sample points, at which it is determined to generate sample values, in the pixels may be traversed for generating sample values by scanning the subpixel rows from left to right. Alternatively, the scanning direction may be altered every other subpixel row in order to render the memory usage more effective. However, any traversal scheme can be implemented in conjunction with the multi-sampling scheme in other embodiments.

By using the multisampling scheme according to the invention, it is only necessary to access the display memory 207 four times to calculate the final value of a pixel. However, by providing an additional small and fast memory (not shown), such as an on-chip cache memory, for temporarily storing samples, which are needed in one or several subsequent computations of pixel values, it is possible to decrease the necessary access to the display memory 207 to a minimum of 1. An on-chip memory containing the previous row of sample values, and the previous sample value would be needed. By reading a new sample value, it would be possible to combine that with the previous one and two from the row buffer. After that the row buffer should be updated with the previous sample value, and then the previous sample value should be updated with the new sample value. By using this approach with the Quicunx scheme it is necessary to access a memory minimum 2 times for the calculation of the final value of a pixel. This is a substantial difference, as the filtering incurs a significant cost in memory bandwidth usage.

Figure 5A:
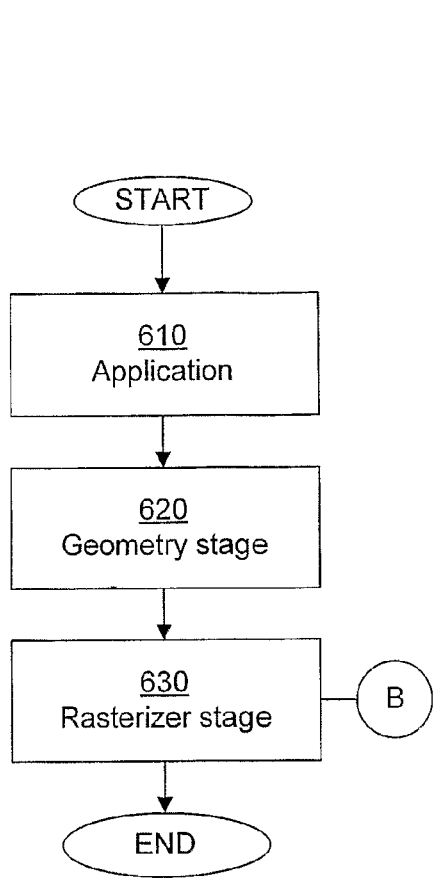
FIGS. 5a-5b are flow-charts of one embodiment of the method according to the invention.

FIG. 5a is of a flow chart illustrating one embodiment a method for producing high-quality anti-aliased pictures. In step 610, the CPU 201 runs the application program (e.g. a computer game) and generates the objects, e.g. 3D-objects, (normally polygons, such as a triangles) that shall be converted into a 2D-presentation on the display.

Next, in step 620, the CPU 201 or the GPU 204 calculates the different visual parameters that affect the appearance of the object on the display, such as lighting, clipping, transformations, projections, etc. As triangles are normally used when creating 3-D objects in computer graphics, the pixel coordinates of the vertices of the triangles are finally calculated.

In step 630 the CPU or the GPU 204 interpolates texture coordinates over the polygon in order to ensure that a correct projection of the texture is obtained. The CPU 201 or GPU 204 may also interpolate one or more colors, another set of texture coordinates, fog, etc. It also performs Z-buffer tests, and ensures that the final pixel obtains the correct color.

Figure 5B:
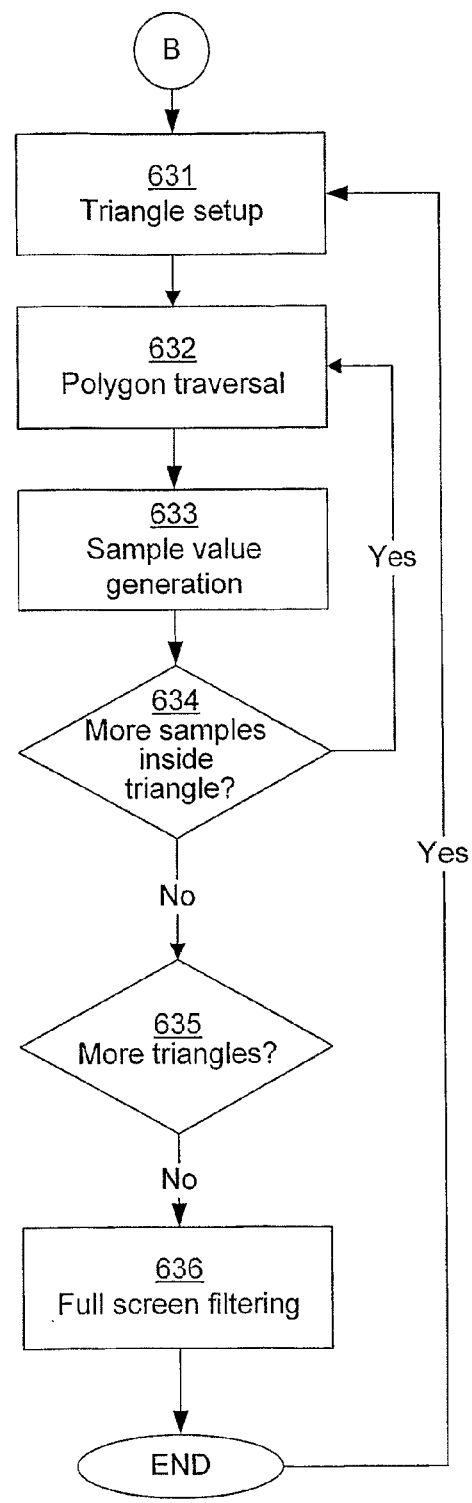

FIG. 5b is a more detailed flow chart illustrating step 630 in FIG. 5a. Step 631 is a polygon (e.g. triangle) setup stage where the CPU 201 or the GPU 204 calculates interpolation data that is used over the entire polygon.

A polygon traversal is performed in step 632, wherein the CPU 201 or the GPU 204 identifies sample points that will lie inside the boundaries of the polygon. There are many different ways to perform this identification. A simple approach is to scan the horizontal rows one by one.

In step 633, sample values are generated for each sample point inside the polygon. Also, z-testing and alpha-testing may be performed in this step. The generated sample values may be stored in the sample buffer 207a.

In step 634 it is determined whether there are any more sample points within the polygon. If the answer in step 634 is yes, the procedure returns to step 632, otherwise the procedure proceeds to step 635.

In step 635 it is determined whether there are any more polygons to render. If the answer in step 635 is yes, the procedure returns to step 631, otherwise the procedure proceeds to step 636.

In step 636, full screen filtering is performed, i.e. the pixel value for all pixels of the screen are generated by weighting together the sample values associated with a specific pixel. At least a subset of the generated plurality of sample values is utilized to determine the pixel value of a plurality of pixels, as described above. Each pixel value is calculated by weighting the plurality of sample values for a certain pixel. Either the GPU 204 or the CPU 201 may provide a weighting device being arranged to retrieve the samples from the sample buffer 207a and weight them to form the pixel values. Each sample value may e.g. comprise texture information and interpolated color information. The calculated pixel values are written to the sample buffer 207a. After all polygons of the picture have been processed, the sample buffer 207a will contain the picture in a high-resolution format (average 1 samples per pixel of the final image). Only visible pixels are processed in this stage. Pixels that are not visible, i.e. pixels that are behind a previously drawn polygon, will not contribute to the final picture.

The present invention has been described above with reference to specific embodiments. However, other embodiments than the above described are possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A method for generating a pixel value from a plurality of sample values, comprising:
    an electronic device performing one or more of the following steps:
    selecting a single sample from each of a plurality of sample regions, each sample region being positioned at a corner of two intersecting borders of said pixel and the size of each sample region being smaller than the size of the pixel and each sample region being both partly outside and partly inside said pixel;
    generating said pixel value from said selected sample values, at least one of said samples being positioned outside said pixel.

2. The method according to claim 1, comprising utilizing at least one of the plurality of sample values generated for determining a certain pixel value when the pixel value of another pixel is determined.

3. The method according to claim 1, comprising generating the plurality of sample values according to a sample pattern, which is different from a sample pattern according to which sample values are generated for determining a pixel value of a neighboring pixel.

4. The method according to claim 1, comprising utilizing four sample values to determine the pixel value of one pixel, each of said four sample values being generated from a sample point within a separate sample region.

5. The method according to claim 1, comprising generating each sample value from a sample point within a sample region being centered around a corner of two intersecting borders of said pixel.

6. The method according to claim 1, comprising generating each sample value from a sample region comprising n times n subpixels, wherein said pixel comprises p times p subpixels and p is larger than n.

7. The method according to claim 1, comprising generating each sample value for determining the pixel value of one pixel from a sample point, each sample point for generating sample values for determining the pixel value of one pixel being positioned at a different distance from the center of the pixel in the x-direction and also at a different distance from the center of the pixel in the y-direction.

8. The method according to claim 7, comprising generating a first sample value from a first sample point positioned in column 1 row 1 of a first sample region, a second sample value from a second sample point positioned in column 2, row 2 of a second sample region, a third sample value from a third sample point positioned in column 2, row 1 of a third sample region, and a fourth sample value from a fourth sample point positioned in column 1, row 2 of a fourth sample region, each of said first, second, third and fourth sample regions being centered around a different corner of two intersecting borders of the pixel.

9. The method according to claim 1, comprising generating an additional sample value from a sample position at the centre of a pixel.

10. A device for generating a pixel value from a plurality of sample values, comprising:
    an electronic sampling device for selecting a single sample from each of a plurality of sample regions, each sample region being positioned at a corner of two intersecting borders of said pixel and the size of each sample region being smaller than the size of the pixel and each sample region being both partly outside and partly inside said pixel; and
    an electronic calculation device for calculating said pixel value from said selected sample values, at least one of said samples being positioned outside said pixel.

11. The device according to claim 10, wherein the sampling device is arranged to utilize at least one of the plurality of sample values generated for determining a certain pixel value when the pixel value of another pixel is determined.

12. The device according to claim 10, wherein the sampling device is arranged to generate the plurality of sample values according to a sample pattern, which is different from the sample pattern according to which sample values are generated for determining a pixel value of a neighboring pixel.

13. The device according to claim 10, wherein the sampling device is arranged to utilize four sample values to determine the pixel value of one pixel, and generate each of said four sample values from a sample point within a separate sample region.

14. The device according to claim 10, wherein the sampling device is arranged to generate each sample value from a sample point within a sample region being centered around a corner of two intersecting borders of said pixel.

15. The device according to claim 10, wherein the sampling device is arranged to generate each sample value from a sample region comprising n times n subpixels, wherein said pixel comprises p times p subpixels, where p is larger than n.

16. The device according to claim 10, wherein the sampling device is arranged to generate each sample value for determining the pixel value of one pixel from a sample point, each sample point for generating sample values for determining the pixel value of one pixel being positioned at a different distance from the center of the pixel in the x-direction and also at a different distance from the center of the pixel in the y-direction.

17. The device according to claim 16, wherein the sampling device is further arranged to generate a first sample value from a first sample point positioned in column 1 row 1 of a first sample region, a second sample value from a second sample point positioned in column 2, row 2 of a second sample region, a third sample value from a third sample point positioned in column 2, row 1 of a third sample region, and a fourth sample value from a fourth sample point positioned in column 1, row 2 of a fourth sample region, each of said first, second, third and fourth sample regions being centered around a different corner of two intersecting borders of the pixel.

18. The device according to claim 10, wherein the sampling device is arranged to generate an additional sample value from a sample position at the centre of a pixel.

19. An electronic apparatus comprising a device for generating a pixel value according to claim 10.

20. The apparatus according to claim 19, wherein the apparatus is a mobile radio terminal, a pager, a communicator, an electronic organizer, a smartphone, a personal digital assistant or a computer.

21. The apparatus according to claim 19, wherein the apparatus is a mobile telephone.

22. A computer readable storage medium having stored therein a set of computer program instructions that cause an electronic device having computer capabilities to execute a method when said electronic device having computer capabilities executes said computer program instructions, the method comprising:

selecting a single sample from each of a plurality of sample regions, each sample region being positioned at a corner of two intersecting borders of said pixel and the size of each sample region being smaller than the size of the pixel and each sample region being both partly outside and partly inside said pixel;

generating said pixel value from said selected sample values, at least one of said samples being positioned outside said pixel.

* * * * *